Sept. 28, 1965   R. L. COPELAND   3,208,793
UPHOLSTERY REPAIR
Filed Nov. 12, 1963
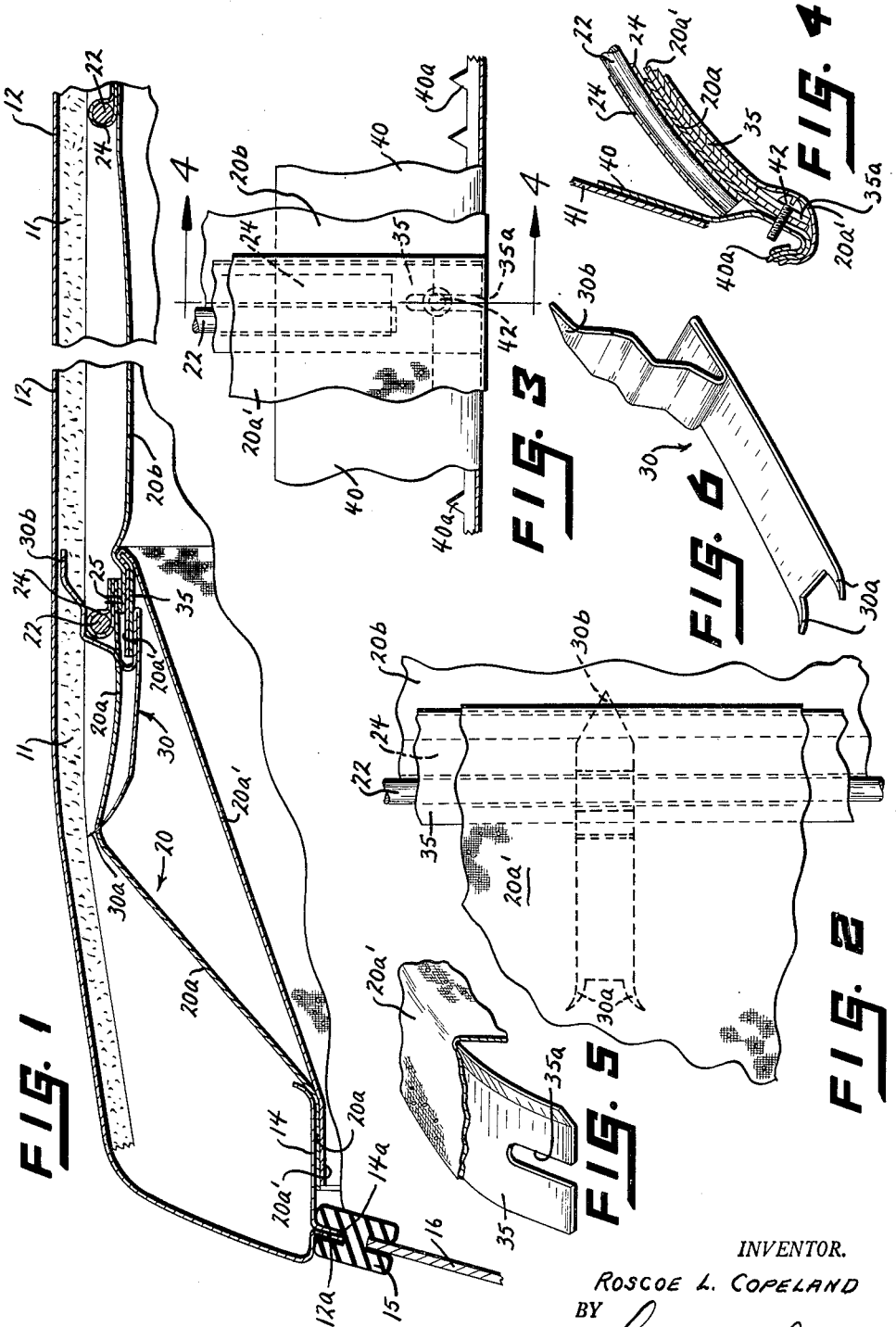
INVENTOR.
ROSCOE L. COPELAND
BY
Attorney … # 3,208,793
UPHOLSTERY REPAIR
Roscoe L. Copeland, St. Louis County, Mo.
(Rte. 2, Gardner Road, Chandler, Ind.)
Filed Nov. 12, 1963, Ser. No. 322,925
5 Claims. (Cl. 296—137)

The present invention relates to upholstery repair, and more particularly to the repair of the headliner of an automobile or like vehicle.

As is known, oftentimes the headliner of an automobile, i.e. the material portion immediately over the heads of the passengers, is damaged, as by puncturing, for example. When the preceding occurs, it has been customary and, actually, the only approach, to replace the entire headliner, meaning considerable expense on the part of the vehicle owner, as well as a time loss insofar as vehicle usage is concerned.

By virtue of the instant invention, the applicant herein has provided a new and novel upholstery repair for the headliner of a vehicle, and more particularly to a headliner repair directed to that section of the headliner between either the front or the rear window and the first bowed rod support with respect to each.

Broadly, the applicant accomplishes the instant desired results through the use of novel clips in combination with a strip having a replacement fabric secured thereto, where, initially, such clips are positioned around the aforesaid bowed support rod and in urging relationship with the inside top of the vehicle body. Another portion of each of the clips provides a tensioning effect because of its engagement with the damaged headliner, and, additionally, move such damaged headliner away from the replacement headliner.

In any event, the aforesaid clips are adapted to receive the strip, and as the latter is received therein and the covering replacement headliner pulled thereover, a concealed repair is effectively accomplished, together with a neat replacement seam, proximate, in location, the seam of the original headliner.

The applicant's invention is not only simple insofar as the type and number of contributing components are concerned, but provides for ready upholstery repair, typifying highly professional end results. Moreover, the required replacement expenditure is a minimum, in that only a small portion of the headliner must be reworked, i.e. the total replacement of the damaged headliner is not necessary.

Accordingly, the principal object of the present invention is to provide a new and novel upholstery repair for a vehicle.

Another object of the present invention is to provide a new and novel upholstery replacement for the headliner of a vehicle, where such replacement is readily accomplished, with optimum performing end results.

A further and more general object of the present invention is to provide a new and novel upholstery repair for an automobile headliner which requires a minimum of cooperating components, which is easily installed without the replacement of the entire damaged headliner, and which represents considerable economies to the vehicle owner, as well as to manufacturers.

Other objects and a better understanding of the present invention will become more apparent from the following description, taken in conjunction with the accompanying drawing, wherein FIG. 1 is a view in vertical section, partly fragmentary, showing the applicant's new and novel upholstery repair in use on a conventional vehicle, where the latter is simplified as to detail;

FIG. 2 is a fragmentary view, looking upward, of the upholstery repair of FIG. 1;

FIG. 3 is a fragmentary view, looking towards the side edge of an upholstery repair in accordance with the present invention, showing certain details thereof;

FIG. 4 is a view in section of the upholstery repair of FIG. 3, taken at line 3—3 of such figure and looking in the direction of the arrows;

FIG. 5 is a perspective view of the applicant's new and novel replacement material carrying strip; and, FIG. 6 is a persepective view of a clip used in accordance with the instant invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel upholstery repair is shown in combination with a typical vehicle roof, headliner and front window assembly, where, conventionally, a sisal padding 11 is disposed adjacent the inside surface of the vehicle roof 12 for silencing and insulating effects. As known, and by way of further illustration, the front portion of the vehicle roof 12 slopes downwardly, ending in a somewhat forwardly extending flange 12a, to which, typically, a flange 14a of the upper front frame member 14 is secured, as by welding. A gasket 15 has a portion which receives the aforesaid united flanges 12a and 14a, where another portion of the gasket 15 receives the upper edge of the front windshield 16 of the vehicle. In any event, and as should be apparent, the aforesaid upper front frame member 14 of the vehicle roof receives, through adhesive means, for example, the forward free edge 20a of the vehicle headliner 20.

As is known, the vehicle headliner 20 is disposed beneath the aforedescribed sisal padding 11, where a series of generally parallel bowed rods 22 support such headliner 20 through hems 24 disposed around each of the rods 22, secured, as by stitchery, at 25, to the headliner 20, and more particularly, at seams defining sections 20a, 20b, etc., of the latter. As is further known, the bowed rods 22 extend laterally beneath the vehicle roof 12, and when in final position, serve to tension or stretch the headliner 20 for optimum appearance.

In any event, and in order to accomplish the instant new and novel vehicle headliner repair, the applicant employs a clip 30, more particularly disclosed in FIGS. 1 and 2, and a strip 35, shown largely in cross-section in FIG. 1. In detail, the clip 30 is made from spring steel, or like material, and has a characteristic shape which includes a portion which is adapted to encircle the bowed rod 22. Additionally, and for reasons of tensioning, to be discussed more fully herebelow, the clip 30 has two upwardly extending rear projections 30a, which are in operative engagement with the damaged headliner 20a, and a pointed end 30b, which typically bears against the inside of the vehicle roof 12.

The strip 35 is made from a flexible material, such as a spring steel, for example, and has a relatively shallow upwardly extending flange along one edge thereof. The replacement material 20a' is secured to one face of the strip 35, typically through adhesive means. It should be understood that the replacement material 20a' matches the damaged headliner segment 20a, so that when the instant repair is completed, the complete headliner 20 is an integrated unit.

In any event, assuming that segment 20a of the headliner 20 has been damaged, as by puncturing, for example, a series of clips 30 are inserted, by means of the pointed end 30b of each, through the damaged headliner segment 20a, until such pointed ends 30b are proximate to or are in engagement with the inside of the vehicle roof 12. In a typical installation, the clips 30 are spaced approximately eight inches apart.

After the preceding step, the upwardly extending projections 30a of each clip 30 are positioned, with the flexing of such clips 30, into the damaged headliner segment 20a. The latter flexing serves at least two purposes, one being to tension each clip 30 into an engaging position with respect to the bowed rod 22 and, additionally, insofar as the point 30b thereof is concerned, into a securing relationship with the inside of the top 12 of the vehicle.

Moreover, the afore-described positioning of the clips 30 also serves to move the damaged headliner segment 20a from its normal path, i.e. in a smoothed tension relationship spanning the space between the seam, in the area of the bowed rod 22, and the upper front frame member 14.

In any event, the strip 35, with its replacement headliner segment 20a' secured thereto, is now urged between the reversed turn portion of each of the clips 30 and the bowed rod 22, where such strip 35 extends laterally beneath the roof 12 of the vehicle. The replacement material 20a' on the strip 35 is positioned on the face of the latter nearest the inside of the vehicle top 12, whereupon, same is drawn around the flanged edge of the strip and, then, forwardly, in a taut or tensioned relationship, towards the upper front frame member 14. The replacement segment 20a' is then secured, by adhesive means, to the damaged segment 20a, which, in turn, was originally secured to the upper front frame member 14.

At this point it should be understood that a clean replacement seam line is presented which is proximate the original seam, and one which, at the same time, provides excellent repair characteristics.

FIGS. 3 and 4 are directed to the arrangement for securing the edges of the headliner replacement segment 20a' in the vehicle. In this regard, a retaining member 40 is normally secured to each side frame 41 of the vehicle, where such retaining member 40 has tooth-like projections 40a along a free edge thereof onto which the respective side edges of the headliner segment 20a are grasped. The preceding arrangement is such that, and conventionally, the ends of the side edges of the headliner segment 20a are concealed beneath the retaining members 40, so as to provide a desirable finished appearance.

With reference to FIG. 5, each of the replacement headliner segment carrying strips 35 has slotted ends 35a which, it will be apparent from the following discussion, are adapted to receive a fastening member 42, such as a conventional screw, for example, which extends into each of the retaining members 40. In this connection, while, in a preferred embodiment of the invention, the portion of the replacement headliner segment 20a' on the upper surface of the strip 35 is cut away in the region of the slotted portions 35a of the latter, the visible portions extends, not only forwardly, to be secured to the upper front frame member 14 of the vehicle, but also downwardly, along its sides, to a position below the lower edge of each retaining member 40.

The latter relationship provides for the concealing of the free ends of the side edges of the replacement headliner segment 20a' behind the retaining members 40 in the same manner as the origial headliner segment 20a, and, of course, approximates the original headliner 20 in overall end appearance.

In use, and after the strip 35 has been disposed, as decribed hereabove, in the respective clips 30, the slotted ends 35a thereof are positioned, through fastening members 42, into secured relationship with each of the retaining members 40. However, before such fastening members 42 are in final secured position, the free ends of each side edge are tucked behind the retaining members 40, and, thereafter, the replacement headliner segment 20a' is drawn to its smoothed and tensioned relationship with a portion of the body of the vehicle.

From the preceding, it should be apparent that the applicant has provided a new and novel headliner upholstery repair for a vehicle, and one which provides for the ready replacement of a single headliner segment, without the necessity of replacing the entire headliner. The applicant's invention, which embodies not only the finished assembly, and a new and novel method of accomplishing such finished assembly, utilizes, as well, a new and novel clip disclosed, in perspective, in FIG. 6, in combination with a replacement material carrying strip, disclosed, in perspective, in FIG. 5. The overall repaired headliner closely approximates the originally installed headliner in appearance, providing a new seam in an area proximate the original seam, and conceals the damaged headliner segment with optimum effects, through a ready replacement procedure.

The upholstery repair described hereabove is, of course, susceptible to various changes within the spirit of the invention. For example, the replacement headliner segment can be directly secured to a portion of the body of the vehicle, and, additionally, the strip 35 and replacement headliner segment 20a' may be integrated. In other words, and in this latter respect, one edge of the replacement headliner segment 20a' could be stiffened, either through plastic or like chemical application, or through bonding techniques. Moreover, the clip 30 could be varied somewhat in overall configuration, as long as the desired tensioning thereof is achieved for effecting the instant repair. Thus, the preceding description should be considered illustrative, and not as limiting the scope of the following claims.

I claim:

1. An upholstery repair for a vehicle having a body, a rod disposed within and extending transversely of said body, and a damaged headliner segment extending between said rod and a portion of said body comprising a plurality of selectively placeable clips having a portion of each partly surrounding said rod and tensioned between said body and said damaged headliner segment, and a strip disposed on another portion of said clip, said strip having a replacement headliner segment secured thereto and extending to said portion of said body.

2. The upholstery repair of claim 1 where said strip is disposed on said another portion of said clip between said rod and the latter.

3. The upholstery repair of claim 1 where said replacement headliner segment conceals said damaged headliner segment and is secured to the same portion of said body as said damaged headliner segment.

4. An upholstery repair for a vehicle having a body, a rod disposed within and extending transversely of said body, and a damaged headliner segment extending between said rod and a portion of said body comprising a plurality of selectively placeable clips having a portion of each partly surrounding said rod and tensioned between said body and said damaged headliner segment, and a replacement headliner segment disposed on said clip and extending to said body to conceal said damaged headliner segment.

5. The method of replacing a damaged vehicle headliner segment disposed within said vehicle between a rod extending transversely of said vehicle and a portion of said body of said vehicle which comprises the steps of disposing a plurality of selectively placeable support clips between a portion of said body and said damaged vehicle headliner segment and partly surrounding said rod, mounting a strip having a replacement headliner segment disposed thereon on a portion of each of said support clips between said rod and the latter, and extending said replacement headliner segment to said body to conceal said damaged vehicle headliner segment.

References Cited by the Examiner

UNITED STATES PATENTS

| | | | |
|---|---|---|---|
| 2,001,136 | 5/35 | Holderback | 296—137 |
| 2,051,191 | 8/36 | Watson | 296—137 |
| 2,083,030 | 6/37 | Mackay | 45—138 |
| 2,096,822 | 10/37 | Oldham | 5—353.1 |
| 2,099,134 | 11/37 | Nissley et al. | 45—138 |
| 2,118,563 | 5/38 | Mackay | 45—138 |
| 2,194,902 | 3/40 | Heuer | 296—137 |
| 2,533,786 | 12/50 | Gagnier | 45—138 |
| 2,539,956 | 1/51 | Klingensmith | 45—138 |
| 3,097,015 | 7/63 | Nagel | 296—137 |

BENJAMIN HERSH, *Primary Examiner.*

FRANK B. SHERRY, A. HARRY LEVY, *Examiners.*